United States Patent Office 3,017,417
Patented Jan. 16, 1962

---

3,017,417
IMPROVEMENTS IN PREPARING ALKYL MALEIC ACID ANHYDRIDES
Pieter Daniel Harkes, Vlaardingen, Netherlands, assignor to Lever Brothers Company, New York, N.Y., a corporation of Maine
No Drawing. Filed Nov. 5, 1959, Ser. No. 851,012
Claims priority, application Great Britain Nov. 7, 1958
7 Claims. (Cl. 260—346.8)

This invention relates to anhydrides and provides a new process for the preparation of dimethyl maleic anhydride.

In Annalen, 267 (1892), pages 186 and 204, Fittig and Parker reported the formation of dimethyl maleic anhydride by heating equimolecular proportions of pyruvic acid, disodium succinate and acetic anhydride for 20 to 30 hours at 110° C. We have investigated this reaction as a possible basis for a commercial production of dimethyl maleic anhydride. We were unable, however, to obtain a reasonably rapid rate of reaction or a yield of more than about 10% of the desired product, based on the pyruvic acid, either when the reactants were used in the relative proportions specified or when the relative proportions were varied over a wide range.

We have now found that considerably higher yields (for example 30 to 40%) can be obtained in relatively short reaction times (for example 3 hours) by reacting a compound of the general formula R.CO.CO.OR' in which R is a methyl or ethyl radical and R' is hydrogen or an aliphatic hydrocarbon radical containing 1 to 24 carbon atoms, with succinic acid anhydride in the presence of a mono-succinate under substantially anhydrous conditions.

The invention will be described with particular reference to the preparation of dimethyl maleic acid anhydride, requiring the use of pyruvic acid or its ester. The invention, however, includes the preparation of methyl ethyl maleic acid anhydride starting from alpha-ketobutyric acid.

The succinic acid anhydride may be formed partially or completely in situ from succinic acid and the anhydride of other aliphatic dicarboxylic acids such as, for example, glutaric acid anhydride and adipic acid anhydride.

In the same way the mono-succinate may be formed, partially or completely in situ, either from succinic acid anhydride and a base (including hydroxy group-containing bases such as alkali metal hydroxides) or from succinic acid and a base free of hydroxy groups, under substantially anhydrous conditions.

According to one method of carrying out the invention, dimethyl maleic anhydride is made by heating pyruvic acid with a molar excess of succinic anhydride, and/or of succinic acid plus the anhydride of another dicarboxylic acid, and a base which is free from hydroxyl groups (preferably a nitrogenous organic base and especially a tertiary amine) in the absence of water.

According to a modification of this method succinic acid and the organic base are wholly or in part replaced by an alkali-metal mono-succinate.

As indicated above, alkyl esters of pyruvic acid can be used instead of that acid itself.

Instead of a tertiary amine or other base that is free from hydroxyl groups, bases containing such groups, for instance alkali-metal hydroxides, can be used, provided that the conditions are such that the hydroxyl content of the base is not liberated in the form of water, for instance by reaction with carboxyl or anhydride groups, during the reaction. Hydroxyl-containing bases should not, therefore, be used when the reaction mixture contains free succinic acid nor should they be present in such proportions as to convert substantial proportions of anhydride into a normal salt of the dicarboxylic acid (that is, a salt in which both carboxyl groups are converted into saline groups) with liberation of water. Reaction of a hydroxyl-containing base with part of the succinic anhydride present to form the monosuccinate of the base does not liberate water and is not objectionable.

Among inorganic bases that can be used under suitable conditions are sodium, potassium, rubidium and caesium hydroxides. It is preferred, however, instead of using these bases as such to use the corresponding monosuccinates. These are preferably used as suspensions in a suitable medium, e.g. iso-propylether or xylene. The alkali metal hydroxides should not be used with succinic acid since they react therewith to form water. Suitable organic bases are tertiary amines such as, for example, pyridine, picoline, lutidine, quinoline, isoquinoline and triethylamine. Pyridine is preferred.

With the monosuccinates of the inorganic bases, yields varying from about 19% (for sodium hydroxide) to 29% (for caesium hydroxide) of dimethyl maleic anhydried, calculated on the amount of pyruvic acid used have been obtained.

With organic bases yields ranging from about 20%–30% for picoline, lutidine, quinoline, isoquinoline and triethylamine, and up to 40% for pyridine under the optimal conditions as outlined below have been obtained.

The molar proportion (based on the pyruvic acid) of succinic anhydride when used with a molar proportion of succinic acid, should be at least 1.5. With increasing molar ratio of succinic anhydride to pyruvic acid, the yield increases. However, as the excess of succinic anhydride has to be recovered after completion of the reaction, for practical purposes an unnecessarily great excess should not be used. It is preferred to employ, for each mol of pyruvic acid about 3 mols of succinic anhydride and about 1 of succinic acid. If succinic acid is omitted it should be replaced by an equimolar amount of succinic anhydride.

When an organic base is used the molar proportion thereof may vary widely. Thus in the presence of succinic acid good yields have been obtained with molar ratios of organic base to pyruvic acid ranging from about 1:3 to 6:1. The best yields have been obtained when this ratio was about 3.5:1. Higher ratios are not found economical. In the absence of succinic acid the best results were obtained when the said ratio was about 1.1:1.

The molar ratio to pyruvic acid of mono alkali-metal salts of succinic acid, whether added as such or formed in situ should preferably be about one. The yields are less with excess of pyruvic acid or of alkali metal compound of succinic acid.

The temperature at which the reactants are brought together may also affect the yield. When succinic anhydride is used in the absence of succinic acid, this temperature may vary widely, for instance between 5 and 135° C. without diminishing the yield. At temperatures below 5° C. the mixture of reactants tends to solidify which increases the overall time of the reaction. On the other hand, mixing the reactants at temperatures as high as 150° C. results in good, though slightly diminished yields. However, when succinic acid is present and a tertiary nitrogen base is used, the yield progressively improves, other things being equal, when the temperature of addition is increased from room temperature to 120–135° C., temperatures within this range giving the best yields. When using the monoalkali metal salts of succinic acid the best yields have been obtained when the mixing was carried out at 80° C., although at lower temperatures, such as for example room temperature, and higher temperatures such as for example 120° C., satisfactory yields have been obtained.

After mixing the reactants it is desirable to keep the reaction mixture at a temperature not higher than 135° C., and preferably between 120 and 135° C. for instance for one hour. To complete the reaction it is necessary to heat the mixture for some time, for instance for 1 to 2 hours, at a higher temperature, preferably about 150° C. It is preferred to add the pyruvic acid dropwise to the mixture of the other reactants.

In a preferred embodiment of the invention pyridine is used and the best results have been obtained by adding pyruvic acid to a mixture of succinic anhydride and pyridine with or without succinic acid. The addition is preferably performed at a temperature of 120 to 135° C., the reaction mixture being kept at that temperature for about one hour and subsequently heated for about 1½ hours at 150° C. The molar ratio of the reactants is preferably as shown in Table I below:

TABLE I

| Reactant | Moles | Reactant | Moles |
| --- | --- | --- | --- |
| Pyruvic acid | 1 | Pyruvic acid | 1 |
| Anhydride of succinic, glutaric or adipic acid. | 3 | Succinic acid anhydride. | 4 |
| Succinic acid | 1 | Organic base | 1.1 |
| Organic base | 3.1 | | |

When using alkali-metal monosuccinates, the reaction is preferably carried out by mixing the anhydride of succinic, glutaric or adipic acid and the monosuccinate and adding pyruvic acid to this mixture. The best results have been obtained when the anhydride was present in a molar proportion three times that of each of the other reactants, the addition was performed at about 80° C. in 30 to 60 minutes and the mixture subsequently heated for about one hour at 150° C. When the anhydride of succinic acid is used, the mono-alkali metal salt of succinic acid may be replaced by corresponding quantities of succinic anhydride and solid alkali metal hydroxide. The invention will now be illustrated by means of the following examples, in which the yield is always given as a percentage of dimethyl maleic anhydride formed, calculated on the initial weight of pyruvic acid.

*Example 1*

This example illustrates the effect of varying the amount of succinic anhydride when the ratio of the other reactants remains the same. The mixture of 0.2 mol of succinic acid and 0.2 mol of pyridine was brought to a temperature of 80° C. using an oil bath. To this mixture 0.2 mol of pyruvic acid was added dropwise in half an hour with constant stirring. The stirring was continued for one hour at the same temperature. Then the succinic anhydride was added and subsequently the temperature was raised to 150° C. The reaction mixture was kept at this temperature for 1½ hours. After the reaction mixture had been cooled, 200 cc. of water were added as well as 0.25 mol of hydrochloric acid to bind the pyridine. The dimethyl maleic anhydride was then removed from the reaction mixture by steam distillation. The yields for different amounts of succinic anhydride are given in the Table II below:

TABLE II

| Amount of succinic anhydride (mols): | Yield (percent) |
| --- | --- |
| 0.3 | 16 |
| 0.4 | 22 |
| 0.5 | 26 |
| 0.6 | 31 |
| 0.7 | 32 |
| 1.0 | 34.5 |

*Example 2*

This example illustrates the effect of varying the proportion of pyridine under conditions as described in Example 1, the amount of succinic anhydride being 0.6 mol. The results are given in Table III.

TABLE III

| Pyridine (mols): | Yield (percent) |
| --- | --- |
| 0.2 | 31 |
| 0.4 | 34 |
| 0.6 | 35 |
| 0.7 | 37 |
| 1.0 | 34 |

*Example 3*

This example illustrates the effect of varying the temperature of addition of pyruvic acid.

A mixture of 0.2 mol of succinic acid, 0.7 mol of pyridine and 0.6 mol of succinic anhydride was heated to the desired temperature. Then 0.2 mol of pyruvic acid was added dropwise during 30 minutes with stirring, which was continued for one hour at said temperature. Subsequently the temperature was raised to 150° C. and kept constant for 1½ hours. The dimethyl maleic anhydride was recovered as in Example 1. The yields are shown in Table IV.

TABLE IV

| Addition temperatures (° C.): | Yield (percent) |
| --- | --- |
| 80 | 37 |
| 120 | 39.5 |
| 135 | 40 |
| 150 | 29 |

*Example 4*

In this example, to which Table V below relates, the process was carried out as described in Example 1 except that succinic acid was omitted, the proportions of succinic anhydride, and of pyridine were as shown in first and second columns respectively of the table, and the temperatures at which pyruvic acid was added were as shown in the third column. The yields are shown in the fourth column.

TABLE V

| Anhydride (Mols) | Pyridine (Mols) | Temperature (° C.) | Yield (Percent) |
| --- | --- | --- | --- |
| 0.6 | 0.7 | 80 | 30 |
| 0.6 | 0.25 | 80 | 32 |
| 0.6 | 0.25 | 120 | 34 |
| 0.8 | 0.25 | 80 | 36 |
| 0.8 | 0.25 | 120 | 39 |
| 1.0 | 0.25 | 120 | 40 |

*Example 5*

This example illustrates the use of mono-sodium succinate together with succinic anhydride, or glutaric anhydride or adipic anhydride.

A solution of 0.2 mol of mono-sodium succinate in 35 cc. of isopropylether was heated to 80° C. To this solution 0.2 mol of pyruvic acid was added dropwise in 40 minutes with constant stirring. The stirring was continued for 50 minutes at the same temperature. Subsequently, the ether was distilled off under reduced pressure. After removal of the ether 0.5 mol of anhydride was added and the temperature raised to 150° C. The reaction mixture was stirred at this temeprature for 60 minutes. After cooling down, the reaction mixture was diluted with water and steam distilled. The distillate was extracted with benzene. The benzene solution thus obtained was dried and after partial removal of benzene, dimethyl maleic anhydride was precipitated by the addition of petroleum ether. The results are given in Table VI.

TABLE VI

| Anhydride of— | Yield (percent) |
|---|---|
| Succinic acid | 19 |
| Glutaric acid | 20 |
| Adipic acid | 15 |

Example 6

Similar trials to those of Example 5 were carried out using succinic anhydride, and instead of mono-sodium succinate other mono-alkali metal succinates. The yields increased from the 19% obtained with the sodium salt to 23% with mono-potassium succinate, 29% with mono-rubidium succinate and 29% with mono-caesium succinate.

Example 7

This example illustrates the results obtained under optimal conditions.

100 g. of succinic anhydride and 25 g. of pyridine were heated to 125° C. At this temperature 22 g. of pyruvic acid was added in half an hour with constant stirring, the stirring being continued at the said temperature for one hour. Subsequently the reaction mixture was heated at 150° C. for 1½ hours. The dimethyl maleic anhydride was then removed from the reaction mixture by steam distillation. The yield was 12.6 g. (40%).

Example 8

This example illustrates the use of ethyl pyruvate instead of pyruvic acid. 75 g. of succinic anhydride and 20 g. of pyridine were heated to 125° C. At this temperature 23 g. of ethyl pyruvate were added in 30 minutes with constant stirring, the stirring being continued at the said temperature for a further 60 minutes. Then the reaction mixture was brought to 150° C. and kept at that temperature for 1½ hours. By steam distillation 10.5 g. (40%) of dimethyl maleic acid anhydride was obtained from the reaction mixture.

Example 9

This example illustrates the effect of using different tertiary amines under the same conditions.

A mixture of 0.2 mol of succinic acid and 0.2 mol of amine was heated to 80° C. Then 0.2 mol of pyruvic acid was added dropwise in 30 minutes with constant stirring. The stirring was continued at the same temperature for 60 minutes. Subsequently 0.5 mol of succinic anhydride was added and the temperature raised to 150° C. After keeping the reaction mixture at this temperature for 1½ hours, is was cooled down. Water was added and steam distillation was effected. After extracting the distillate with benzene, dimethyl maleic anhydride was precipitated in the same way as described in Example 5.

The results are given in Table VII.

TABLE VII

| Tertiary amine | Yield (Percent) | |
|---|---|---|
| | Under the conditions described in Example 9 | Under optimal conditions |
| Triethylamine | 20 | 31 |
| Pyridine | 26 | 40 |
| Quinoline | 17 | 26 |
| Isoquinoline | 18 | 28 |
| Picoline | 17 | 26 |
| Lutidine | 13 | 20 |

Example 10

This example illustrates the preparation of methyl ethyl maleic acid anhydride.

0.5 of pure alpha-keto-butyric acid was added dropwise in 30 minutes with constant stirring to a mixture of 2 mol of succinic acid anhydride and 0.55 mol of pyridine at a temperature of 120 to 135° C. The addition being completed, the reaction mixture was kept for one hour at 135° C. and then heated at 150° C. for 1½ hours. After cooling down, 500 cc. of water were added together with 0.6 mol of hydrochloric acid to bind the pyridine. The methyl ethyl maleic acid anhydride was then recovered from the reaction mixture by steam distillation. The yield was 32% of pure methyl ethyl maleic acid anhydride having a boiling point of 108–109° C./16 mm., a $n_D^{20}=1.4710$ and a molecular weight of 140.6.

I claim:
1. The process for preparing alkyl maleic anhydrides which comprises reacting a compound of the formula

$$R.CO.COOR'$$

wherein R is an alkyl group containing not more than 2 carbon atoms and R' is selected from the group consisting of hydrogen, methyl and ethyl, with succinic anhydride in the presence of a compound selected from the group consisting of pyridine, picoline, lutidine, quinoline, isoquinoline and triethylamine and the hydrogen succinates of sodium, potassium, rubidium and caesium under substantially anhydrous conditions.
2. A process according to claim 1 in which the succinic anhydride is formed in situ from succinic acid and the anhydride of an alkylene dicarboxylic acid containing in total 5 to 6 carbon atoms.
3. A process according to claim 1 in which the hydrogen succinate is formed in situ from succinic anhydride and a base.
4. A process according to claim 1 in which pyridine is employed.
5. The process of claim 1 wherein R is a methyl group.
6. The process of claim 1 wherein R is an ethyl group.
7. The process of claim 1 wherein R is a methyl group, the compound R.CO.COOR' is added to not less than 1.5 molecular proportions of succinic anhydride in the presence of pyridine at a temperature of 120–135° C., and the mixture is then heated at about 150° C.

References Cited in the file of this patent

Fittig et al.: Annalen der Chemie 1891, vol. 267, pages 186–191 and 204–5.

UNITED STATES PATENT OFFICE
CERTIFICATE OF CORRECTION

Patent No. 3,017,417                                January 16, 1962

Pieter Daniel Harkes

It is hereby certified that error appears in the above numbered patent requiring correction and that the said Letters Patent should read as corrected below.

Column 6, line 18, after "0.5" insert -- mol --.

Signed and sealed this 1st day of May 1962.

(SEAL)
Attest:

ERNEST W. SWIDER
Attesting Officer

DAVID L. LADD
Commissioner of Patents